United States Patent
Sacchetti et al.

(10) Patent No.: US 6,399,533 B2
(45) Date of Patent: *Jun. 4, 2002

(54) COMPOUNDS AND CATALYSTS FOR THE POLYMERIZATION OF OLEFINS

(75) Inventors: Mario Sacchetti, Ferrara; Stefano Pasquali, Fossanova San Marco; Gabriele Govoni, Renazzo, all of (IT)

(73) Assignee: Basell Technology Company bv, Hoofddorp (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/927,059

(22) Filed: Sep. 10, 1997

Related U.S. Application Data

(62) Division of application No. 08/451,008, filed on May 25, 1995, now Pat. No. 5,698,487.

(51) Int. Cl.⁷ .................... B01J 31/00; B01J 37/00; C08F 4/02; C08F 4/60
(52) U.S. Cl. ............... 502/125; 502/126; 502/127; 502/132; 502/134
(58) Field of Search ................ 502/117, 118, 502/119, 120, 125, 126, 127, 132, 134

(56) References Cited

U.S. PATENT DOCUMENTS

| | | | | |
|---|---|---|---|---|
| 2,827,446 A | * | 3/1958 | Breslow | 260/94.9 |
| 2,924,593 A | * | 2/1960 | Breslow | 260/94.9 |
| 4,399,054 A | * | 8/1983 | Ferraris et al. | 252/429 B |
| 4,495,338 A | * | 1/1985 | Mayr et al. | 502/134 |
| 4,542,199 A | * | 9/1985 | Kaminsky et al. | 502/117 |
| 5,106,804 A | * | 4/1992 | Bailly et al. | 502/117 |
| 5,118,648 A | * | 6/1992 | Furtek et al. | 502/125 |
| 5,132,262 A | * | 7/1992 | Rieger et al. | 502/117 |
| 5,139,985 A | * | 8/1992 | Barbe et al. | 502/125 |
| 5,162,278 A | * | 11/1992 | Razavi | 502/117 |
| 5,633,419 A | * | 5/1997 | Spencer et al. | 502/134 |
| 5,691,264 A | * | 11/1997 | Sacchetti et al. | 502/134 |
| 5,698,487 A | * | 12/1997 | Sacchetti et al. | 502/117 |

FOREIGN PATENT DOCUMENTS

| | | | |
|---|---|---|---|
| EP | 0 129 368 | * | 12/1984 |
| EP | 0 185 918 | * | 7/1986 |
| EP | 0 318 048 | * | 5/1989 |
| EP | 0 439 964 | * | 8/1991 |
| EP | 0 447 071 | * | 9/1991 |
| EP | 0 485 820 | * | 5/1992 |
| EP | 0 485 822 | * | 5/1992 |
| EP | 0 485 823 | * | 5/1992 |
| EP | 0 500 944 | * | 9/1992 |
| EP | 0 519 237 | * | 12/1992 |
| EP | 0 522 581 | * | 1/1993 |
| EP | 0 549 900 | * | 7/1993 |
| EP | 0 533 805 | * | 8/1993 |
| EP | 0 533 806 | * | 8/1993 |
| EP | 0 576 213 | * | 12/1993 |
| EP | 0 588 404 | * | 3/1994 |
| EP | 0 604 855 | * | 7/1994 |
| FR | 2 656 315 | * | 6/1991 |
| JP | 63-168408 | * | 7/1988 |

OTHER PUBLICATIONS

US 2001/0011060 A1, U.S. Patent pre–publication to Sacchetti et al., Aug. 2, 2001.*
US 2001/0023231 A1, U.S. Patent pre–publication to Sacchetti et al., Sep. 20, 2001.*

* cited by examiner

*Primary Examiner*—Elizabeth D. Wood
*Assistant Examiner*—J. Pasterczyk
(74) *Attorney, Agent, or Firm*—Bryan Cave LLP

(57) ABSTRACT

The present invention relates to components of catalysts for the polymerization of olefins comprising a metallocene compound and a magnesium halide which have particular values of porosity and surface area. Group 4 and vanadium metallocenes are useful metallocenes and the components typically include an electron donor such as an ether, ester or ketone. In particular the components of the invention have surface area (BET) greater than about 50 $m^2/g$, porosity (BET) greater than about 0.15 $cm^3/g$ and porosity (Hg) greater than 0.3 $cm^3/g$, with the proviso that when the surface area is less than about 150 $m^2g$, the porosity (Hg) is less than about 1.5 $cm^3/g$. The magnesium halide is complexed by an ether, ester, or ketone electro donor. The components of the invention are particularly suitable for the preparation of catalysts for the gas-phase polymerization of $\alpha$-olefins.

24 Claims, No Drawings

COMPOUNDS AND CATALYSTS FOR THE POLYMERIZATION OF OLEFINS

This is a divisional, of U.S. application Ser. No. 08/451,008 filed May 25, 1995, now U.S. Pat. No. 5,698,487.

BACKGROUND OF THE INVENTION

The present invention relates to components of catalysts for the polymerization of olefins, the catalysts obtained therefrom and the use of said catalysts in the polymerization of olefins $CH_2=CHR$, in which R is hydrogen or an alkyl, cycloalkyl or aryl radical with 1–10 carbon atoms. Another aspect of the present invention relates to the polymers obtained using said catalysts.

Catalysts are known from the literature that are obtained from compounds $ML_x$ in which M is a transition metal, especially Ti, Zr and Hf, L is a ligand coordinating to the metal, x is the valence of the metal and at least one of the ligands L has cyclo-alkadienyl structure. Catalysts of this type using compounds $Cp_2TiCl_2$ or $Cp_2ZrCl_2$ (Cp=cyclopentadienyl) are described in U.S. Pat. Nos. 2,827,446 and 2,924,593. The compounds are used together with alkyl-Al compounds in the polymerization of ethylene. The catalytic activity is very low. Catalysts with very high activity are obtained from compounds $Cp_2ZrCl_2$ or $Cp_2TiCl_2$ and from their derivatives substituted in the cyclopentadienyl ring, in which the Cp ring can also be condensed with other rings, and from polyalumoxane compounds containing the repeating unit —(R)AlO—, in which R is a lower alkyl, preferably methyl (U.S. Pat. No. 4,542,199 and EP-A-129368).

Catalysts of the type mentioned above, in which the metallocene compound contains two indenyl or tetrahydroindenyl rings bridge-bonded through lower alkylenes or through other divalent radicals, are suitable for the preparation of stereoregular polymers of propylene and other α-olefins (EP-A-185918).

Stereospecific catalysts are also obtained from dicyclopentadienyl compounds in which the two rings are substituted differently with groups having steric hindrance such as to prevent rotation of the rings about the axis of coordination with the metal.

Substitution of indenyl or tetrahydroindenyl in suitable positions gives catalysts that have very high stereospecificity (EP-A-485823, EP-A-485820, EP-A-519237, U.S. Pat. No. 5,132,262 and U.S. Pat. No. 5,162,278).

The metallocene catalysts described above produce polymers with a very narrow molecular weight distribution (Mw/Mn of about 2).

Some of these catalysts also have the property of forming copolymers of ethylene with α-olefins of the LLDPE type or ethylene/propylene elastomeric copolymers with very uniform distribution of the comonomer units. The LLDPE polyethylene obtained is further characterized by low solubility in solvents such as xylene or n-decane.

The polypropylene obtained with the highly stereospecific catalysts mentioned above has greater crystallinity and a higher deformation temperature compared with the polymer that can be obtained with the conventional Ziegler-Natta catalysts.

However, these metallocene catalysts have a considerable drawback with respect to the possibility of being employed in industrial processes for production of polyolefins that are not carried out in solution, owing to the fact that they are soluble in the reaction medium in which they are prepared and in the liquid medium of polymerization.

In order to be usable in gas-phase polymerization processes, the catalysts must be supported on suitable supports which endow the polymer with appropriate morphological properties.

Supports of various kinds have been used, including, among others, porous metal oxides such as silica or porous polymeric supports such as polyethylene, polypropylene and polystyrene. The halides of magnesium are also used as supports. In some cases magnesium halides are also used as counterion of an ion pair in which the metallocene compound supplies the cation and a compound, such as a Mg halide, supplies the anion.

When Mg halide is used for supplying the anion, the catalytic system is formed by the halide present in solid form and the metallocene compound dissolved in a solvent. A system of this type cannot be used in gas-phase polymerization processes. Mg halide is preferably used in finely divided form that can be obtained by grinding.

As support, Mg halide is used in pulverized form, obtainable by grinding. Catalysts obtained in this way are not of high performance. Sufficiently high yields can only be obtained when the Mg halide is used in a form in which it is partially complexed with an electron-donor compound, obtained by a special method of preparation.

Japanese Application No. 168408/88 (published on 12.7.1988) describes the use of magnesium chloride as support for metallocene compounds, such as $Cp_2TiCl_2$, $Cp_2ZrCl_2$, $Cp_2Ti(CH_3)_2$ for forming, with trialkyl aluminium and/or polymethylalumoxane (MAO), catalysts for the polymerization of ethylene. The component containing the magnesium chloride is prepared by grinding $MgCl_2$ with the metallocene compound, also working in the presence of electron-donor compounds. Alternatively, the component is prepared by treating the metallocene with a liquid $MgCl_2$-alcohol adduct and subsequent reaction with $AlEt_2Cl$. The catalyst activity, referred to $MgCl_2$ is very low.

Catalysts comprising a metallocene compound of the type $Cp_2ZrCl_2$ supported on $MgCl_2$ in spherical form and partially complexed with an electron-donor compound are described in U.S. Pat. No. 5,106,804. The performance of these catalysts is better than that described in Japanese Application No. 168408/88 but is still not satisfactory, since it is not possible to obtain polymers containing sufficiently low residues of the catalyst. The electron donor used must be free from atoms of active hydrogen and in addition must be uniformly distributed in the bulk of the Mg halide. Suitable supports cannot be obtained by mere mixing of the components. Homogeneous dispersion of the electron donor is obtained by forming the Mg halide (by halogenation of Mg-dialkyls) in the presence of a solvent containing the electron donor in dissolved form. The surface area of the Mg halide is not greater than 100 $m^2/g$, and is preferably between 30 and 60 $m^2/g$. No information is given with respect to the porosity of the support. The electron-donor compound is used in a quantity of from 0.5 to 15 mol % based on the Mg halide; its presence is necessary. The catalysts obtained have performance that is much lower than that of the corresponding unsupported catalysts in which the metallocene compound is used in solution.

Application EP-A-318048 describes catalysts in which a solid component comprising a compound of Ti supported on a magnesium chloride that has particular characteristics of surface area and of porosity and possibly an electron-donor compound, is used with benzyl compounds of Ti or Zr or with metallocene compounds of the type $Cp_2Ti(CH_3)_2$ and bis-(indenyl)-$Zr(CH_3)_2$ for forming catalysts for polymerization of ethylene and of propylene. The weight ratio of metallocene to magnesium chloride is very high (greater than 1), so it is necessary to remove the metallocene from the obtained polymer. The catalysts are used in processes that are carried out in the presence of a liquid polymerization medium.

Application EP-A-439964 describes bimetallic catalysts suitable for the preparation of ethylene polymers with broad molecular weight distribution (Mw/Mn between 4 and 14) obtained by supporting a metallocene on a solid component containing a Ti compound supported on $MgCl_2$. MAO or its mixtures with alkyl-Al are used as cocatalyst. Trialkyl-Al compounds are also used as cocatalysts but the catalytic activity is low. The yields of these mixed catalysts with active centres derived either from the Ti compound supported on $MgCl_2$ or from the metallocene compound are very high when the catalysts are used in a hydrocarbon medium; on the other hand they are low when polymerization is effected in the gas phase. This is probably due to the fact that, when using a hydrocarbon medium, as the metallocene compound is not fixed to the support in a stable form, it dissolves in the hydrocarbon polymerization solvent. In practice, the obtained catalyst corresponds to a homogeneous catalyst in which the metallocene compound is used in solution. Working in the gas phase, the metallocene compound is present as a solid and the catalyst obtained therefrom has an activity lower than that of the corresponding catalyst used in solution.

Application EP-A-522281 describes catalysts obtained from $Cp_2ZrCl_2$ supported on $MgCl_2$ and from mixtures of trialkyl-Al and compounds supplying stable anions of the type dimethylaniline-tetrakis-(pentafluorophenyl)-borate. The catalysts are prepared by grinding the components and are used to polymerize ethylene in the presence of a solvent (toluene) with good yields (based on $MgCl_2$). In this case too, the metallocene compound is present largely in solution and not fixed to $MgCl_2$ and the relatively high activity based on $MgCl_2$ is due essentially to the catalyst dissolved in the polymerization medium.

Application EP-A-509944 describes catalysts using aniline-tetrakis-(pentafluorophenyl)-borate or Lewis acids such as $MgCl_2$ together with metallocene halides pre-reacted with alkyl-Al compounds. The magnesium chloride is ground before being contacted with the pre-reacted metallocene compound. The yields of polymer based on the Mg halide are not high (less than about 100 g polymer/g $MgCl_2$). The Mg halide has surface are between 1 and 300 $m^2/g$, preferably between 30 and 300 $m^2/g$. Mg chloride with area between 30 and 300 $m^2/g$ is obtained essentially by grinding the commercial chloride. In this case it is difficult for the area to exceed 100–150 $m^2/g$ and the porosities are relatively low (less than 0.1 $cm^3/g$). Also in the case of the catalysts described in Application EP-A-509944 the yields should largely be attributed to the metallocene compound dissolved in the polymerization solvent.

Application EP-A-588404 describes catalysts obtained from metallocene compounds supported on Mg halides prepared by halogenation of dialkyl-Mg or alkyl-Mg halides with $SiCl_4$ or $SnCl_4$. The yields of polymer (polyethylene) per g of solid component and per g of Zr are relatively high, especially when the catalyst is obtained from $MgCl_2$ prepared using $SnCl_4$. Again in this case it is to be assumed that the high catalytic activity is due more to the catalyst derived from the metallocene compound that dissolves in the polymerization medium than from that derived from the metallocene compound actually supported on the Mg halide.

European Application EP-A-576213 describes catalysts obtained from a solution of $MgCl_2$ in an alcohol, from a trialkyl-Al compound and from a metallocene compound. The yields of polymer are very low. The catalyst is practically inactive when the $MgCl_2$ solution is replaced by solid $MgCl_2$ activated by prolonged grinding.

DESCRIPTION OF THE INVENTION

Solid components have now unexpectedly been found that comprise a metallocene compound and a magnesium halide, capable of giving catalysts that have very high activity in the polymerization of olefins, characterized by surface area (BET method) greater than about 50 $m^2/g$, porosity (BET method) greater than about 0.15 $cm^3/g$ and porosity (Hg method) greater than 0.3 $cm^3/g$, with the proviso that when the surface area is less than about 150 $m^2/g$, the porosity (Hg) is less than about 1.5 $cm^3/g$.

The porosity and surface area according to the BET method are determined using the "SORPTOMATIC 1800" apparatus from Carlo Erba.

The porosity according to the Hg method is determined using a "Porosimeter 2000 series" porosimeter from Carlo Erba, following the procedure described below.

The porosity (BET) is preferably above 0.2 $cm^3/g$ and in particular between 0.3 and 1 $cm^3/g$. The surface area (BET) is preferably greater than 100 $m^2/g$ and more preferably greater than 150 $m^2/g$. A very convenient range is between 150 and 800 $m^2/g$. Components with surface area less than 150 $m^2/g$ give catalysts with performance that is of interest, provided that the porosity (Hg method) is less than about 1.5 $cm^3/g$, preferably between 0.4 and 1.2 $cm^3/g$, and in particular between 0.5 and 1.1 $cm^3/g$.

The components are preferably used in the form of spherical particles smaller than 150 μm.

In the components with surface area (BET) less than 150 $m^2/g$ more than 50% of the porosity (BET) is due to pores with radius greater than 300 Å and preferably between 600 and 1000 Å.

The components with surface area (BET) greater than 150 $m^2/g$ and in particular greater than 200 $m^2/g$ exhibit, along with porosity (BET) due to pores with radius between 300 and 1000 Å, also porosity (BET) due to pores with radius between about 10 and 100 Å. In general, more than 40% of the porosity (BET) is due to pores with radius greater than 300 Å.

The mean dimensions of the crystallites of Mg halide present in the solid component are generally below 300 Å and more preferably below 100 Å. The definition of the components of the invention also includes those components which, in normal conditions, do not display the values of area and porosity stated above but attain them after treatment with a solution of trialkyl-Al at 10% in n-hexane at 50° C. for 1 hour.

The components of the invention are prepared by supporting a metallocene compound on a Mg halide or on a support containing Mg halide that has characteristics of surface area and of porosity that are within the ranges stated for the catalytic component.

In general the surface area (BET) and the porosity (BET) and porosity (Hg) of the starting magnesium halide are greater than those of the component obtained from it.

Preferred Mg halides have surface area (BET) greater than 200 $m^2/g$ and more preferably between 300 and 800 $m^2/g$ and porosity (BET) greater than 0.3 $cm^3/g$.

The Mg halide can comprise, in smaller proportions, other components acting as co-support or used for improving the properties of the catalytic component. Examples of these components are $AlCl_3$, $SnCl_4$, $Al(OEt)_3$, $MnCl_2$, $ZnCl_2$, $VCl_3$, $Si(OEt)_4$.

The Mg halide can be complexed with electron-donor compounds not containing active hydrogen in a quantity up to about 30 mol %, preferably 5–15 mol % based on the Mg halide. Examples of electron donors are ethers, esters, ketones.

The Mg halide can in its turn be supported on an inert support that has area and porosity such that the supported product has the values stated above. Suitable inert supports can be metal oxides such as silica, alumina, silica-alumina, possessing porosity (BET) greater than 0.5 cm$^3$/g and surface area (BET) greater than 200 m$^2$/g and for example between 300 and 600 m$^2$/g.

Other inert supports can be porous polymers such as polyethylene, polypropylene and polystyrene.

Partially crosslinked polystyrene that has high values of surface area and porosity is particularly suitable.

Polystyrenes of this type are described in U.S. Pat. No. 5,139,985, whose description of the method of preparation and supporting of the magnesium halide is included here for reference. These polystyrenes generally have surface area (BET) between 100 and 600 m$^2$/g and porosity (BET) greater than 0.5 cm$^3$/g.

The amount of Mg halide that can be supported is generally between 1 and 20% by weight based on the mixture. The preferred Mg halide is Mg chloride. The Mg halide can be supported according to known methods, starting from its solutions in solvents such as tetrahydrofuran or by impregnation of the inert support with solutions of the halide in an alcohol; the alcohol is then removed by reaction with a compound such as a trialkyl-Al or dialkyl-Al halide or silicon halides. The alcohols used are generally alcohols with 1–8 carbon atoms.

A method that is very suitable for preparation of Mg halides that have the characteristics of porosity and area stated above, consists of reacting spherulized adducts of $MgCl_2$ with alcohols, the said adducts containing from 0.1 to 3 mol of alcohol with alkyl-Al compounds, in particular triethyl-Al, triisobutyl-Al, $AlEt_2Cl$.

A preparation of this type is described in U.S. Pat. No. 4,399,054 whose description is herein included for reference.

For the purpose of obtaining supports with morphological characteristics that are particularly suitable for gas-phase polymerization processes in a fluidized bed, the adduct of $MgCl_2$ with about 3 mol of alcohol should be submitted, prior to reaction with the alkyl-Al, to a controlled partial dealcoholizing treatment such as that described in European Patent Application EP-A-553806, to which reference is made for the description. The Mg halides thus obtained have a spheroidal shape, mean dimensions less than 150 microns, surface area (BET) greater than 60–70 m$^2$/g and generally between 60 and 500 m$^2$/g.

Other methods of preparation of the Mg halides suitable for preparation of the components of the invention are those described in European Patent Application EP-A-553805, whose description is herein included for reference.

Supporting of the metallocene compound is carried out according to known methods by bringing the Mg halide into contact, for example, with a solution of the metallocene compound, operating at temperatures between room temperature and 120° C. The metallocene compound that is not fixed on the support is removed by filtration or similar methods or by evaporating the solvent.

The amount of metallocene compound supported is generally between 0.1 and 5% by weight expressed as metal.

The atomic ratio of Mg to transition metal is generally between 10 and 200; it can, however, be less and reach values of 1 or even less when the Mg halide is supported on an inert support.

The metallocene compounds are sparingly soluble in hydrocarbons (the hydrocarbon solvents most used are benzene, toluene, hexane, heptane and the like). Their solubility increases considerably if the solvent contains a dissolved alkyl-Al compound such as triethyl-Al, triisobutyl-Al or a polyalkylalumoxane, in particular MAO (polymethylalumoxane) in molar ratios with the metallocene compound greater than 2 and preferably between 5 and 100.

Impregnation of the support starting from the solution mentioned above makes it possible to obtain particularly active catalysts (the activity is greater than that of the catalysts that can be obtained from solutions of the metallocene compound that do not contain the alkyl-Al compound or MAO).

The metallocene compounds that can be used are selected from the compounds of a transition metal M selected from Ti, V, Zr and Hf containing at least one πbond between a transition metal and a cyclopentadienyl-group containing moiety and comprising preferably at least one ligand L coordinated on the metal M possessing a mono- or polycyclic structure containing conjugated π electrons.

The said compound of Ti, V, Zr or Hf is preferably selected from components possessing the structure:

| | |
|---|---|
| $Cp^I MR^1_a R^2_b R^3_c$ | (I) |
| $Cp^I 1 Cp^{II} MR^1_a R^2_b$ | (II) |
| $(Cp^I\text{-}A_e\text{-}Cp^{II})M^1 R^1_a R^2_b$ | (III) | in which M is Ti, V, Zr or Hf; $Cp^I$ and $Cp^{II}$, identical or different, are cyclopentadienyl groups, including substituted ones; two or more substituents on the said cyclopentadienyl groups can form one or more rings possessing from 4 to 6 carbon atoms; $R^1$, $R^2$ and $R^3$, identical or different, are atoms of hydrogen, halogen, an alkyl or alkoxyl group with 1–20 carbon atoms, aryl, alkaryl or aralkyl with 6–20 carbon atoms, an acyloxy group with 1–20 carbon atoms, an allyl group, a substituent containing a silicon atom; A is an alkenyl bridge or one with structure selected from:

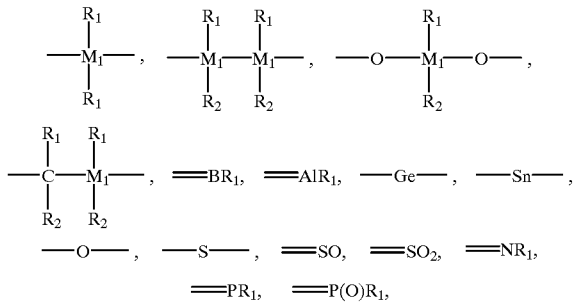

which $M_1$ is Si, Ge, or Sn; $R^1$ and $R_2$, identical or different, are alkyl groups with 1–4 carbon atoms or aryl groups with 6–10 carbon atoms; a, b, c are, independently, integers from 0 to 4; e is an integer from 1 to 6 and two or more of the radicals $R^1$, $R^2$ and $R^3$ can form a ring. In the case when the Cp group is substituted, the substituent is preferably an alkyl group with 1–20 carbon atoms.

Representative compounds that have formula (I) include: $(C_5Me_5)MMe_3$, $(C_5Me_5)M(OMe)_3$, $(C_5Me_5)MCl_3$, $(Cp)MCl_3$, $(Cp)MMe_3$, $(C_5MeH_4)MMe_3$, $(C_5Me_3H_2)MMe_3$, $(C_5Me_4H)MMe_3$, $(Ind)MBenz_3$, $(H_4Ind)MBenz_3$, $(Cp)MBu_3$.

Representative compounds that have formula (II) include: $(Cp)_2MMe_2$, $(Cp)_2MPh_2$, $(Cp)_2MEt_2$, $(Cp)_2MCl_2$, $(Cp)_2M(OMe)_2$, $(Cp)_2M(OMe)Cl$, $(C_5MeH_4)_2MCl_2$, $(C_5Me_5)_2MCl_2$, $(C_5Me_5)_2MMe_2$, $(C_5Me_5)_2MMeCl$, $(Cp)(C_5Me_5)MCl_2$, $(1\text{-MeFlu})_2MCl_2$, $(Me_5Cp_5)_2M(OH)Cl$, $(Me_5Cp_5)_2M(OH)_2$, $(C_5BuH_4)_2MCl_2$, $(C_5Me_3H_2)_2$ $MCl_2$, $(C_5Me_4H)_2$ $MCl_2$, $(C_5Me_5)_2$ $M(OMe)_2$, $(C_5Me_5)_2M(C_6H_5)_2$, $(C_5Me_5)_2$ $M(CH_3)Cl$, $(C_5EtMe_4)_2MCl_2$, $[(C_6H_5)C_5Me_4]_2$ $MCl_2$, $(C_5Et_5)_2MCl_2$, $(C_5Me_5)_2M(C_6H_5)Cl$, $(Ind)_2MCl_2$, $(Ind)_2MMe_2$, $(H_4 Ind)_2MCl_2$, $(H_4 Ind)_2\text{-}MMe_2$, $\{[Si(CH_3)_3]Cp\}_2$ $MCl_2$, $\{[Si(CH_3)_3]_2Cp\}_2$ $MCl_2$, $(C_5Me_4H)(C_5Me_5)MCl_2$.

Representative compounds of formula (III) include: $C_2H_4(Ind)_2MCl_2$, $C_2H_4(Ind)_2MMe_2$, $C_2H_4(H_4Ind)_2MCl_2$, $C_2H_4(H_4Ind)_2MMe_2$, $Me_2Si(C_5Me_4H)_2MCl_2$, $Me_2Si(C_5Me_4H)_2MMe_2$, $Me_2SiCp_2MCl_2$, $Me_2$ $SiCp_2MMe_2$, $Me_2Si(C_5Me_4H)_2MMeOMe$, $Me_2Si(Flu)_2MCl_2$, $Me_2Si(2\text{-Et-5-iPrCp})_2MCl_2$, $Me_2Si(H_4Ind)_2MCl_2$, $Me_2Si(H_4 Flu)_2MCl_2$, $Me_2SiCH_2(Ind)_2MCl_2$, $Me_2Si(2\text{-Me-H}_4Ind)_2MCl_2$, $Me_2Si(2\text{-MeInd})_2MCl_2$, $Me_2Si(2\text{-Et-5-iPr-Cp})_2MCl_2$, $Me_2Si(2\text{-Me-5-EtCp})_2MCl_2$, $Me_2$ $Si(2\text{-Me-5-Me-Cp})_2MCl_2$, $Me_2Si(2Me\text{-}4,5\text{-benzoindenyl})_2MCl_2$, $Me_2Si(4,5\text{-benzoindenyl})_2MCl_2$, $Me_2Si(2\text{-EtInd})_2MCl_2$, $Me_2Si(2\text{-iPr-Ind})_2MCl_2$, $Me_2Si(2\text{-t-butyl-Ind})MCl_2$, $Me_2Si(3\text{-t-butyl-5-MeCp})_2MCl_2$, $Me_2Si(3\text{-t-butyl-5-MeCp})_2MMe_2$, $Me_2Si(2\text{-MeInd})_2$ $MCl_2$, $C_2H_4(2\text{-Me-4,5-benzoindenyl})_2MCl_2$, $Me_2C(Flu)CpMCl_2$, $Ph_2 Si(Ind)_2MCl_2$, $Ph(Me)Si(Ind)_2MCl_2$, $C_2H_4(H_4Ind)M(NMe2)OMe$, isopropylidene-(3-t-butyl-Cp)(Flu)$MCl_2$, $Me_2C(C_5Me_4H)(C_5MeH_4)MCl_2$, $Me_2Si(Ind)_2MCl_2$, $Me_2Si(Ind)2MMe_2$, $Me_2Si(C_5Me_4H)_2MCl(OEt)$, $C_2H_4(Ind)_2M(NMe_2)_2$, $C_2H_4(C_5Me_4H)_2MCl_2$ Me-$Ind)_2MCl_2$, $C_2H_4(3\text{-Me-Ind})_2MCl_2$, $C_2H_4(4,7\text{-Me}_2\text{-Ind})_2MCl_2$, $C_2H_4(5,6\text{-Me}_2\text{-Ind})_2MCl_2$, $C_2H_4(2,4,7\text{-Me}_3Ind)_2MCl_2$, $C_2H_4(3,4,7\text{-Me}_3Ind)_2MCl_2$, $C_2H_4(2\text{-Me-H}_4Ind)_2MCl_1$, $C_2H_4(4,7\text{-Me}_2\text{-H}_4Ind)_2MCl_2$, $C_2H_4(2,4,7\text{-Me}_3\text{-H}_4Ind)_2MCl_2$, $Me_2Si(4,7\text{-Me}_2\text{-Ind})_2MCl_2$, $Me_2Si(\text{-}5,6\text{-Me}_2\text{-Ind})_2MCl_2$, $Me_2Si(2,4,7\text{-Me}_3\text{-H}_4Ind)_2MCl_2$.

In the simplified formulae given above, the symbols have the following meanings:

Me=methyl, Et=ethyl, iPr=isopropyl, Bu=butyl, Ph=phenyl, Cp=cyclopentadienyl, Ind=indenyl, $H_4$Ind=4,5,6,7-tetra-hydroindenyl, Flu=fluorenyl, Benz=benzyl, M=Ti, Zr or Hf, preferably Zr.

Also preferred are metallocene compounds having the formula $(Me_5C_5)_2M(OH)Cl$ or $(Me_5C_5)_2M(OH)_2$, wherein m is a transition metal selected from Ti, V, Zr and Hf, Me=methyl and Cp=cyclopentadienyl.

Compounds of the type $Me_2Si(2\text{-Me-Ind})_2ZrCl_2$ and $Me_2Si(2\text{-Me-H}_4Ind)ZrCl_2$ and their methods of preparation are described respectively in European Applications EP-A-485822 and 485820 whose description is included here for reference.

Compounds of the type $Me_2Si(3\text{-t-butyl-5-MeCp})_2ZrCl_2$ and of the type $Me_2Si(2\text{-Me-4,5-benzoindenyl})ZrCl_2$ and their method of preparation are described respectively in U.S. Pat. No. 5,132,262 and in Patent Application EP-A-549900 whose description is included here for reference.

The components of the invention form, with alkyl-Al compounds or with polyalkyl-alumoxane compounds or their mixtures, catalysts that possess very high activity relative to the Mg halide.

The alkyl-Al compound is generally selected from compounds of formula $AlR_3$, in which R is an alkyl that has 1–12 carbon atoms, and the alumoxane compounds containing the repeating unit —$(R^4)AlO$—, in which $R^4$ is an alkyl radical containing from 1 to 6 carbon atoms, and the said alumoxane compounds contain from 2 to 50 repeating units that have the formula described above. Typical examples of compounds that have the formula $AlR_3$ are trimethyl-Al, triethyl-Al, triisobutyl-Al, tri-n-butyl-Al, trihexyl-Al, trioctyl-Al. Among the alumoxane compounds, use of MAO is preferable. Mixtures of alkyl-Al compounds, preferably triisobutyl- Al, and alumoxane compounds, preferably MAO, are also used advantageously.

When the transition metal compound containing at least one π bond between a transition metal and a cyclopentadienyl-group containing moiety is of the type described in formulae (II) and (III), the compounds obtained from the reaction between $AlR_3$ and $H_2O$ in molar ratios between 0.01 and 0.5 can be used advantageously.

In general the alkyl-Al compound is used in molar ratios relative to the transition metal between 10 and 5000, preferably between 100 and 4000, and more preferably between 500 and 2000.

The catalysts of the invention can be used for (co)polymerizing $CH_2$=CHR olefins, in which R is hydrogen or an alkyl radical with 1–10 carbon atoms or an aryl.

They are used in particular for polymerizing ethylene and its mixtures with α-olefins of the type stated above in which R is an alkyl radical.

The catalysts, particularly those obtained from compounds of the type $C_2H_4(Ind)_2ZrCl_2$, $C_2H_4(H_4Ind)ZrCl_2$ and $Me_2Si(Me_4Cp)_2ZrCl_2$, are suitable for producing LLDPE (copolymers of ethylene containing smaller proportions, generally below 20 mol %, of α-olefin $C_3$–$C_{12}$) characterized by relatively low density values in relation to the content of α-olefin, with reduced solubility in xylene at room temperature (below approx. 10% by weight) and with molecular weight distribution Mw/Mn between about 2.5 and 5.

The polypropylenes that can be obtained with the catalysts using a chiral metallocene compound are characterized by increased stereoregularity, high molecular weights that are easily controllable, and high degree of crystallinity.

The chiral metallocene compounds that can be used are for example of the type described in European Application EP-A-485823, EP-A-485820, EP-A-519237, and U.S. Pat. No. 5,132,262, and 5,162,278.

The following examples are given for the purpose of illustrating but not limiting the invention. The properties stated are determined in accordance with the following methods:

Porosity and surface area (BET): are determined according to BET methods (apparatus used: SORPTOMATIC 1800 from Carlo Erba). The porosity is calculated from the integral pore distribution curve in, function of the pores themselves.

Porosity and surface area with mercury: are determined by immersing a known quantity of the sample in a known quantity of mercury inside a dilatometer and then gradually increasing the pressure of the mercury hydraulically. The pressure of introduction of the mercury into the pores is a function of their diameter. Measurement is effected using a "Porosimeter 2000 series" porosimeter from Carlo Erba. The porosity, pore distribution and surface area are calculated from data on the decrease of volume of the mercury and from the values of the applied pressure.

The porosity and surface areas stated in the descriptions and in the examples are referred to pore dimensions up to 10000 Å, Size of the catalyst particles: is determined by a method based on the principle of optical diffraction of monochromatic laser light with the "Malvern Instr. 2600" apparatus. The average size is stated as P50.

Melt Index E (MIE): determined according to ASTM-D 1238, method E.

Melt Index F (MIF): determined according to ASTM-D 1238, method F.

Ratio of degrees (F/E): ratio between Melt Index F and Melt Index E.

Flowability: is the time taken for 100 g of polymer to flow through a funnel whose discharge hole has a diameter of 1.25 cm and whose walls are inclined at 20° C. to the vertical.

Apparent density:. DIN 53194.

Morphology and granulometric distribution of the particles of polymer: ASTM-D 1921-63.

Fraction soluble in xylene: measured by dissolving the polymer in boiling xylene and determining the insoluble residue after cooling to 25° C.

Content of comonomer: percentage by weight of comonomer determined from IR spectrum.

Density: ASTM-D 792.

Average size of $MgCl_2$ crystallites [D(110)]: is determined from measurement of the width at half-height of the (110) diffraction line that appears in the X-ray spectrum of the magnesium halide, applying Scherrer's equation:

$D(110)=(K\cdot 1.542\cdot 57.3)/(B-b)\cos\theta$, in which:

K=constant (1.83 in the case of magnesium chloride);
B=half-width (in degrees) of the (110) diffraction line;
b=instrumental broadening;
θ=Bragg angle.

In the case of magnesium chloride, the (110) diffraction line appears at an angle 2θ of 50.2°.

EXAMPLES

EXAMPLE 1

Preparation of the support

A spherical adduct $MgCl_2\cdot 3EtOR$ was prepared according to the procedure described in Example 2 of U.S. Pat. No. 4,399,054, operating at 3000 rpm instead of at 10000 rpm. The adduct was partially dealcoholized by heating in a stream of nitrogen at temperatures increasing from 30° C. to 180° C., until an adduct containing 10% by weight of EtOH was obtained.

Preparation of the metallocene/triisobutylaluminium solution

A reactor with capacity of 1000 cm³, equipped with an anchor stirrer and treated with $N_2$, was fed with 382.5 cm³ of triisobutylaluminium (TIBAL) in hexane solution (100 g/litre) and 14.25 g of ethylene-bis-indenyl zirconium dichloride (EBI). The system was stirred in $N_2$ atmosphere at 20° C. for 1 hour. A clear solution was obtained at the end of this period.

Preparation of the catalyst

A reactor with capacity of 1000 cm³, equipped with an anchor stirrer, and treated with $N_2$ at 90° C. for 3 hours, was loaded, at 20° C. in a nitrogen atmosphere, with 600 cm³ of heptane and 60 g of the support prepared previously. While stirring at 20° C., 238 cm³ of hexane solution of TIBAL (100 g/l) were introduced in 30 minutes. The mixture was heated to 80° C. in 1 hour and kept at this temperature for 2 hours. The mixture was then cooled to 20° C. and 62.5 cm³ of the TIBAL/EBI solution previously prepared were added. The system was heated to 60° C. in 30 minutes and kept at this temperature for 2 hours. At the end of this period 3 washings with hexane were effected at 60° C., removing the solvent by evaporation under vacuum at maximum temperature of about 60° C. Approximately 62 g of spherical catalyst, with the following characteristics, was obtained: Mg=21.33%; Cl=66.59%; Al=0.96%; Zr=0.41%; EtO=0.3%;

| Surface area (Hg) | 70.9 m²/g |
| Porosity (Hg) | 1.041 cm³/g |
| Surface area (BET) | 61.9 m²/g |
| Porosity (BET) | 0.687 cm³/g |

Polymerization (LLDPE)

0.05 g of the catalyst described above and 0.42 g of methyl alumoxane (MAO) in 100 cm³ of toluene were precontacted for 5 minutes at 20° C. in a glass flask, which had been treated with $N_2$ at 90° C. for 3 hours. The whole was placed in a 4-litre steel autoclave, equipped with an anchor stirrer, and treated with $N_2$ at 90° C. for 3 hours, containing 800 g of propane at 30° C. The autoclave was heated to 75° C. and 0.1 bar of $H_2$ was introduced and then, simultaneously, 7 bar of ethylene and 100 g of 1-butene. Polymerization was carried out for 1 hour, keeping the temperature and the ethylene pressure constant. 115 g of ethylene-butene copolymer was obtained (g copolymer per g catalyst=2300; kg copolymer per g Zr=545) with the following characteristics: MIE=0.84; F/E=49.16; η=1.35; density=0.914; butene=10.1%; insoluble in xylene=97.42%.

Polymerization (HDPE)

0.42 g of MAO and 0.05 g of the catalyst described above in 100 cm³ of toluene were precontacted for 5 minutes at 30° C. in a glass flask that had been treated with $N_2$ at 90° C. for 3 hours. The whole was then placed in a 4-litre steel autoclave, equipped with an anchor stirrer and treated with $N_2$ at 90° C. for 3 hours, containing 1.6 litres of hexane at 20° C. The autoclave was heated to 75° C. and 7 bar of ethylene and 0.25 bar of $H_2$ were introduced. Polymerization was effected for 1 hour, keeping the ethylene temperature and pressure constant. Polymerization was stopped by instantaneous degassing of the autoclave and, after cooling to 20° C., the polymer slurry was discharged and was dried at 80° C. in nitrogen atmosphere. 100 g of polyethylene were obtained (2000 g polyethylene/g catalyst; 492 kg polyethylene/g Zr), with the following characteristics: MIE=12.9; F/E=22.5; η=0.7.

EXAMPLE 2

Preparation of the metallocene/alumoxane solution

A 1000 cm³ reactor, equipped with an anchor stirrer and treated with $N_2$, was loaded with 600 cm³ of toluene, 18.87 g of polymethyl-alumoxane (MAO) and 8.46 g of EBI. The system was stirred in an atmosphere of $N_2$ at 20° C. for 1 hour. A clear solution was obtained at the end of this period.

Preparation of the catalyst

A 1000 cm³ reactor, equipped with an anchor stirrer and treated with $N_2$ at 90° C. for 3 hours, was fed, in an atmosphere of $N_2$ at 20° C., with 600 cm³ of heptane and 60 g of support prepared according to the methodology in Example 1. While stirring at 20° C., 86.4 cm³ of solution of trimethylaluminium (TMA) in hexane (100 g/litre) were introduced in 30 minutes. In 1 hour the system was heated to 80° C. and was maintained at this temperature for 2 hours. The mixture was then cooled to 20° C. and 62.5 cm³ of the MAO/EBI solution previously prepared were introduced. The system was heated to 60° C. in 30 minutes and was kept at this temperature for 2 hours. At the end of this period, 3 washings with hexane were effected at 60° C., removing the solvent by evaporation under vacuum at maximum temperature of about 60° C. 65 g of spherical catalyst with the following characteristics was obtained: Mg=19.3%; Cl=61.5%; Al=3.87%; Zr=0.33%; OEt=4.3%.

Polymerization (HDPE)

0.05 g of the catalyst described above was precontacted with MAO (0.42 g) in the conditions of Example 2. Then ethylene was polymerized in the conditions in Example 2, obtaining 100 g of polymer (2000 g polyethylene/g cat; 575 kg polymer/g Zr) with the following characteristics: MIE=9.5; F/E=12.68; η=0.66.

EXAMPLE 3

Preparation of the metallocene/alumoxane solution

Preparation was effected in the same conditions as Example 2 but using 47.18 g of MAO instead of 18.87 g.

Preparation of the catalyst

The catalyst was prepared following the procedure described in Example 2, using 166.6 cm³ of the metallocene-alumoxane solution described above. Once the solvent had been removed by evaporation, approx. 65 g of spherical catalyst with the following characteristics were obtained: Mg=18.41; Cl=57.5; Al=5.56; Zr=0.42.

Polymerization (HDPE)

0.05 g of the catalyst described above was precontacted and polymerized in the same conditions as in Example 1, using 0.1 bar of $H_2$ instead of 0.25 bar. 80 g of polyethylene were obtained (1600 g polyethylene/g cat; 381 kg polyethylene/g Zr), with the following characteristics: MIE=5.9; F/E=17.9; η=0.77.

EXAMPLE 4

Preparation of the support

A spherical adduct $MgCl_2.3EtOH$ was prepared following the procedure described in Example 2 of U.S. Pat. No. 4,399,054, operating at 3000 rpm instead of at 10000 rpm. The adduct was partially dealcoholized by heating in a stream of nitrogen at temperatures increasing from 30° C. to 180° C., until an adduct containing 35% by weight of EtOH was obtained.

Preparation of the metallocene/triisobutylaluminium solution

A reactor with capacity of 1000 cm³, equipped with an anchor stirrer and treated with $N_2$, was loaded with 382.5 cm³ of triisobutylaluminium (TIBAL) in hexane solution (100 g/litre) and 14.25 g of ethylene-bis-indenyl zirconium dichloride (EBI). The system was stirred in an atmosphere of $N_2$ at 20° C. for 1 hour. A clear solution was obtained at the end of this period.

Preparation of the catalyst

A reactor with capacity of 3000 cm³, equipped with an anchor stirrer and treated with $N_2$ at 90° C. for 3 hours, was loaded, at 20° C. in an atmosphere of nitrogen, with 600 cm³ of heptane and 60 g of the support previously prepared. While stirring at 20° C., 900 cm³ of hexane solution of TIBAL (100 g/l) were introduced in 30 minutes. The mixture was heated to 80° C. in 1 hour and was maintained at this temperature for 2 hours. The mixture was then cooled to 20° C. and 62.5 cm³ of the TIBAL/EBI solution prepared previously were introduced. The system was heated to 60° C. in 30 minutes and was maintained at this temperature for 2 hours. At the end of this period, 3 washings were effected with hexane at 60° C., removing the solvent by evaporation under vacuum at the maximum temperature of about 60° C. After drying, about 65 g of catalyst with the following characteristics were obtained: Zr=0.6%; Mg=15.3%; Cl=48.2%; Al=4.6%;

| | |
|---|---|
| Surface area (Hg) | 24.1 m²/g |
| Porosity (Hg) | 0.359 cm³/g |
| Surface area (BET) | 129.2 m²/g |
| Porosity (BET) | 0.837 cm³/g |

Polymerization (LLDPE)

0.05 g of the catalyst described above was precontacted and polymerized following the same procedure as in Example 1, using 0.25 bar of $H_2$ instead of 0.1 bar. At the end, 170 g of ethylene-butene copolymer were obtained (3400 g copolymer/g cat; 564 kg copolymer/g Zr) with the following characteristics: MIE=4.76; F/E=32.2; η=1.1; density=0.9135; butene=10.5%; insoluble in xylene=95%.

EXAMPLE 5

Preparation of the catalyst

A reactor with capacity of 1000 cm³, equipped with an anchor stirrer and treated with $N_2$ at 90° C. for 3 hours, was loaded, in an atmosphere of $N_2$ at 20° C., with 500 cm³ of toluene and 100 g of the support prepared according to the procedure in Example 4. While stirring at 20° C., 55 g of trimethylaluminium (heptane solution 100 g/l) were introduced, and then the mixture was heated at 105° C. for 3 hours. At the end the temperature was lowered to 20° C. and 102 cm³ of the TIBAL/ EBI solution prepared according to the procedure in Example 4 were introduced then the whole was heated at 80° C. for 2 hours. After removing the solvent by evaporation, about 120 g of spherical catalyst with the following characteristics were obtained: Zr=0.6%; Mg=16.5%; Cl=49.2%; Al=6.7%;

| | |
|---|---|
| Surface area (Hg) | 33.8 m²/g |
| Porosity (Hg) | 0.495 cm³/g |
| Surface area (BET) | 171.3 m²/g |
| Porosity (BET) | 0.291 cm³/g |

Polymerization (HDPE)

0.05 g of the catalyst described above was precontacted and polymerized in the same conditions of Example 1, using 0.1 bar of $H_2$ instead of 0.25 bar. 115 g of polyethylene (2300 g polyethylene/g cat) with the following characteristics were obtained: MIE=0.78; F/E=66.8.

EXAMPLE 6

Preparation of the support

A spherical adduct MgCl$_2$.3EtOH was prepared following the procedure described in Example 2 of U.S. Pat. No. 4,399,054, operating at 3000 rpm instead of at 10000 rpm. The adduct was partially dealcoholized by heating in a stream of nitrogen at temperatures increasing from 30° C. to 180° C., until an adduct containing 45% by weight of EtOH was obtained. 2360 g of spherical adduct thus obtained were loaded into a 30-litre reactor containing 18 litres of hexane. While stirring at room temperature, 1315 g of AlEt$_3$ in hexane solution (100 g/litre) were introduced. The mixture was heated to 60° C. in 60 minutes and was maintained at this temperature for 60 minutes. The liquid phase was separated and 15 litres of hexane were introduced. The treatment with AlEt$_3$ was repeated twice more operating under the same conditions. At the end, the spherical support obtained was washed 5 times with hexane and was dried under vacuum.

Preparation of the catalyst

A 1000 cm$^3$ reactor, equipped with an anchor stirrer and treated with N$_2$ at 90° C. for 3 hours, was loaded, in an atmosphere of nitrogen at 20°, with 500 cm$^3$ of toluene and 60 g of support. 53.68 cm$^3$ of the metallocene/TIBAL solution prepared according to the procedure in Example 4 were then introduced, stirring continuously for 2 hours at. 20° C. At the end, four washings were effected with hexane at 20° C., removing the solvent by evaporation under vacuum. About 62 g of spherical catalyst with the following characteristics were obtained: Zr=1.1%; Mg=16.6%; Cl=55.3%; Al=3.6%; OEt=3.2%;

| Surface area (Hg) | 38.3 m$^2$/g |
|---|---|
| Porosity (Hg) | 0.604 cm$^3$/g |
| Surface area (BET) | 298.9 m$^2$/g |
| Porosity (BET) | 0.327 cm$^3$/g |

Polymerization (LLDPE)

0.05 g of the catalyst described above was polymerized using the same procedure as in Example 1, obtaining 160 g of ethylele-butene copolymer (3200 g copolymer/g cat; 290 kg copolymer/g Zr) with the following characteristics: MIE=1.28; F/E=50.7; butene=10.5%; η=1.37; insoluble in xylene=95.32%; density=0.9122.

The test was repeated using 1.45 g of TIBAL instead of 0.42 g of MAO and 1 bar of H$_2$ instead of 0.1. 10 g of copolymer was obtained (200 g copolymer/g cat; 17.3 kg copolymer/g Zr) with η=0.3.

EXAMPLE 7

Preparation of the catalyst

The catalyst was prepared according to the procedure of Example 6, except that the four washings with hexane were not effected at the end of the preparation. About 63 g of spherical catalyst were obtained, with the following characteristics: Zr=1.11%; Mg=13%; Cl=44.8%; Al=3.9%; OEt=6.4%;

| Surface area (Hg) | 19.7 m$^2$/g |
|---|---|
| Porosity (Hg) | 0.476 cm$^3$/g |
| Surface area (BET) | 230.2 m$^2$/g |
| Porosity (BET) | 0.197 cm$^3$/g |

Polymerization (LLDPE)

0.05 g of the catalyst described above was polymerized according to the methodology described in Example 1, using 1 bar of H$_2$ instead of 0.1 and 150 g of butene instead of 100. 330 g of ethylene-butene copolymer were obtained (6600 g copolymer/g cat; 597 kg copolymer/g Zr), with the following characteristics: MIE=16.3; F/E=34.6; η=0.76; density=0.9097; Mw/Mn=3.7.

EXAMPLE 8

Preparation of the catalyst

A reactor with capacity of 1000 cm$^3$, equipped with an anchor stirrer and treated with N$_2$ at 90° C. for 3 hours, was loaded, in an atmosphere of N$_2$ at 20° C., with 600 cm$^3$ of heptane and 60 g of support prepared according to the methods in Example 6. While stirring at 20° C., 86.4 cm$^3$ of solution of trimethyl-aluminium (TMA) in hexane (100 g/litre) were introduced in 30 minutes. The system was heated to 80° C. in 1 hour and was maintained at this temperature for 2 hours. The solution was than cooled to 20° C. and 272 cm$^3$ of EBI/MAO solution prepared according to the procedure of Example 3 were introduced. The mixture was heated to 60° C. in 30 minutes and was maintained at this temperature for 2 hours. At the end of this period the solvent was removed by evaporation under vacuum at maximum temperature of about 60° C. for about 3 hours. About 63 g of spherical catalyst with the following characteristics were obtained: Zr=0.8%; Mg=12.6%; Cl=40%; Al=9.3%.

Polymerization (LLDPE)

0.05 g of the catalyst described above was used for the preparation of an ethylene-butene copolymer according to the procedure in Example 1, using 1.45 g of TIBAL instead of 0.42 g of MAO. At the end, 45 g of copolymer were obtained (900 g copolymer/g cat; 110 kg copolymer/g Zr), with the following characteristics: MIE=8.34; F/E=28.91; η=1.15; insoluble in xylene=81.5%; density=0.905.

EXAMPLE 9

Preparation of support

The support was prepared according to the procedure described in Example 1.

Preparation of the catalyst

In a 1000 cm$^3$ reactor, equipped with a mechanical stirrer and pretreated with N$_2$ at 90° C. for 3 hours, 600 cm$^3$ of hexane and 120 g of the above described support were fed at 20° C. under a nitrogen atmosphere; 16.2 g of isoamyl ether was then added over 30 minutes and the system was heated to 50° C. and kept at this temperature for 1 hour. At the end of this period it was cooled to 20° C., 5 g of ethylene bisindenyl zirconium chloride was added and the whole was kept stirred for 15 minutes. Then, 15.7 g of diethyl aluminium monochloride (100 g/l solution in hexane) was added and the mixture was heated to 40° C. maintaining at this temperature for 1 hour. After this period, the mixture was cooled to 20° C., the solid was allowed to settle and the liquid phase was removed. 600 cm$^3$ of hexane and 15.7 g of AlEt$_2$Cl were fed and the above described treatment was repeated. Finally the product was washed three times with 200 cm$^3$ of hexane at 60° and three times with 200 cm$^3$ of hexane at 20°, obtaining 102 g of spherical catalyst component having the following characteristics: Mg=21.4%; Cl=65.79%; Al=0.3%; Zr=0.67%; isoamyl ether=2.0%; EtO=3.8%.

Polymerization (HDPE)

The so obtained catalyst was used to prepare HDPE according to the process described in Example 2. 240 g of polymer were obtained (4813 g PE/g catalyst; 780 Kg PE/g Zr) having the following characteristics: MIE=1.02; F/E=62; η=1.08; Mw/Mn=2.9.

EXAMPLE 10

Preparation of support

The support was prepared according to the procedure described in Example 6.

Preparation of the metallocene/triisobutylaluminium solution

In a 1000 cm$^3$ reactor, equipped with mechanical stirrer and purged with nitrogen, 620 cm$^3$ of triisobutyl aluminium in hexane solution (100 g/l) and 42 g of ethylene-bis-4,7-dimethylindenyl zirconium dichloride (EBDMI) were fed. The reaction was carried out as described in Example 1.

Preparation of the catalyst

Into a previously purged 2 l reactor, 250 cm$^3$ of heptane and 35 g of the above described support were fed. The mixture was cooled to 0° C. and 505 cm$^3$ of TIBAL (100 g/l solution in hexane) were added; the whole was heated to 60° C. for 1 hour and subsequently cooled to 20° C. 31 cm$^3$ of the above described EBDMI/TIBAL solution was fed and the mixture was heated to 70° C. for 2 hours, after which it was cooled to 20° C.; the solid was allowed to settle and the liquid was siphoned. After drying under vacuum at 50° C., about 30 g of spherical catalyst was obtained, having the following characteristics: Mg=15.95%; Cl=54.75%; Al=3.2%; Zr=0.98%; EtO=7.0%.

Polymerization (LLDPE)

The so obtained catalyst was used in the preparation of LLDPE according to example 1, using 1.45 g of TIBAL instead of 0.42 g of MAO. 100 g of copolymer was obtained (g copolymer/g cat=2000; Kg of copolymer/g Zr=200) having the following characteristics: MIE=0.48; F/E=45.83; density=0.919; Insolubility in xylene=98.51%.

EXAMPLE 11

Preparation of support

The support was prepared according to the procedure described in Example 8.

Preparation of the metallocene/methylaluminoxane solution

Into a previously purged one litre reactor, 600 cm$^3$ of toluene, 76.5 g of methylaluminoxane and 15.6 g of EBDMI were fed; the system was kept under stirring at 20° C. for 2 hours.

Preparation of the catalyst

Into a previously purged 1 litre reactor, 200 cm$^3$ of toluene and 100 g of the above described support were added; subsequently 200 cm$^3$ of the above described metallocene/MAO solution was added and the system was heated to 40° C. and kept stirred at this temperature for 2 hours. Finally the solid was allowed to settle and the liquid was removed by syphoning. The obtained sold was then washed four times with 200 cm$^3$ of hexane at 20° C. and subsequently dried. 125 g of spherical catalyst was obtained having the following characteristics: Cl=45.35%; Mg=16.25%; Al=7.1%; Zr=0.45%.

Polymerization (LLDPE)

The above described catalyst was used to prepare LLDPE according to the procedure of example 10. 37.7 g of polymer were obtained (754 g copolymer/g catalyst; 167 Kg of copolymer/g di Zr) with the following characteristics: MIE=0.4; F/E=46.25; Insolubility in xylene=97%; η=1.77; Density=0.913.

What is claimed is:

1. A component of catalysts for the polymerization of olefins comprising a compound of a transition metal M selected from the group consisting of Ti, V, Zr, and Hf containing at least one π bond between said transition metal and a cyclopentadienyl-group containing moiety, and a Mg halide wherein the component is characterized by a surface area (BET) greater than 50 m$^2$/g, porosity (BET) greater than 0.15 cm$^3$/g and porosity (Hg) greater than 0.3 cm$^3$/g, with the proviso that when the surface area is less than about 150 m$^2$/g, the porosity (Hg) is less than about 1.5 cm$^3$/g; and wherein the Mg halide is complexed with the transition metal M-containing compound, and one or more electron donor compounds not containing active hydrogen in an amount up to about 30 mol % based on the Mg halide and the electron donor compounds are selected from the group consisting of ethers, esters and ketones.

2. A component according to claim 1, the component having surface area greater than 150 m$^2$/g and porosity (BET) greater than 0.2 cm$^3$/g.

3. The component of claim 1, wherein the electron donor compound is diisoamyl ether.

4. A component according to claim 1, wherein more than 40% of the porosity (BET) of the component is due to pores with radius greater than 300 Å.

5. A component according to claim 1, wherein more than 50% of the porosity (BET) of the component is due to pores with radius between 600 Å and 1000 Å.

6. A component according to claim 1, wherein the component is in the form of spheroidal particles with size smaller than 150 microns.

7. A component according to claim 1, wherein the component is obtained by supporting a compound of a transition metal M selected from Ti, V, Zr and Hf containing at least one M-π bond, on a halide of Mg or on a support containing a halide of Mg that has surface area between 200 and 800 m$^2$/g and porosity (BET) greater than 0.3 cm$^3$/g and porosity (Hg) greater than 0.3 cm$^3$/g.

8. A component according to claim 7, wherein the halide of Mg is in the form of spheroidal particles with size smaller than 150 microns.

9. A component according to claim 7, wherein the halide of Mg is supported on an inert support selected from the group consisting of silica, alumina, and silica-alumina all possessing a surface area between 300 and 600 m$^2$/g and porosity (BET) greater than 0.5 cm$^3$/g, and partially crosslinked polystyrene with a surface area between 100 and 500 m²/g and porosity (BET) greater than 0.5 cm³/g.

10. A component according to claim 8, wherein the halide of Mg is obtained from spherulized $MgX_2$.alcohol adducts that are then reacted with an alkyl-Al compound to remove the alcohol.

11. A component according to claim 10, wherein the Mg halide is Mg chloride obtained from $MgCl_2$.3ROH adducts, in which R is an alkyl radical with 1–8 carbon atoms, which are submitted to partial dealcoholizing and then reacted with the alkyl-Al compound.

12. A component according to claim 1, wherein the transition metal compound contains at least one ligand L coordinated on the metal M, which has a mono- or polycyclic structure containing conjugated π electrons.

13. A component according to claim 12, wherein the transition metal compound is selected from compounds having the structure:

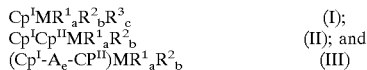

| | |
|---|---|
| $Cp^I MR^1_a R^2_b R^3_c$ | (I); |
| $Cp^I Cp^{II} MR^1_a R^2_b$ | (II); and |
| $(Cp^I-A_e-Cp^{II})MR^1_a R^2_b$ | (III) | in which M is Ti, V, Zr or Hf; $Cp^I$ and $Cp^{II}$, identical or different, are cyclopentadienyl groups, including substituted ones; two or more substituents on the said cyclopentadienyl groups can form one or more rings possessing from 4 to 6 carbon atoms; $R^1$, $R^2$ and $R^3$, identical or different, are atoms of hydrogen, halogen, an alkyl or alkoxyl group with 1–20 carbon atoms, aryl, alkaryl or aralkyl with 6–20 carbon atoms, an acyloxy group with 1–20 carbon atoms, an alkyl group, or a substituent containing a silicon atom; A is an alkenyl bridge or a bridge with a structure selected from the group consisting of:

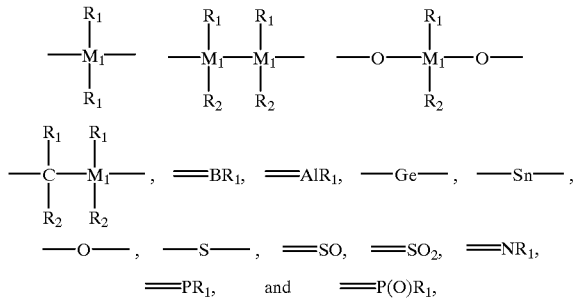

in which $M_1$ is Si, Ge, or Sn; $R_1$ and $R_2$, identical or different, are alkyl groups with 1–4 carbon atoms or aryl groups with 6–10 carbon atoms; a, b, c are, independently, integers from 0 to 4; e is an integer from 0 to 6 and two or more of the radicals $R^1$, $R^2$ and $R^3$ can form a ring.

14. A component according to claim 12, wherein the transition metal compound is selected from compounds that have the formula: $(C_5Me_5)MMe_3$, $(C_5Me_5)M(OMe)_3$, $(C_5Me_5)MCl_3$, $(Cp)MCl_3$, $(Cp)MMe_3$, $(MeCp)MMe_3$, $(C_5Me_3H_2)MMe_3$, $(C_5Me_4H)MCl_3$, $(Ind)MBenz_3$, $(H_4 Ind)MBenz_3$, and $(Cp)MBu_3$.

15. A component according to claim 12, wherein the transition metal compound is selected from compounds that have the formula: $(Cp)_2MMe_2$, $(Cp)_2MPh_2$, $(Cp)_2MEt_2$, $(Cp)_2MCl_2$, $(Cp)_2M(OMe)_2$, $(Cp)_2M(OMe)Cl$, $(C_5MeH_4)_2MCl_2$, $(C_5Me_5)_2MCl_2$, $(C_5Me_5)_2MMe_2$, $(C_5Me_5)_2MMeCl$, $(Cp)(C_5Me_5)MCl_2$, $(1-MeFlu)_2MCl_2$, $(C_5BuH_4)_2MCl_2$, $(C_5Me_3H_2)_2MCl_2$, $(C_5Me_4H)_2MCl_2$, $(C_5Me_5)_2M(OMe)_2$, $(C_5Me_5)_2M(C_6H_5)_2$, $(C_5Me_5)_2M(CH_3)Cl$, $(C_5Me_4Et)_2MCl_2$, $[(C_6H_5)Me_4C_5]_2MCl_2$, $\{Si(CH_3)_3 [C_5H_5]_2\}MCl_2$, $(C_5Et_5)_2MCl_2$, $(C_5Me_5)_2M(C_6H_5)Cl$, $(Ind)_2MCl_2$, $(Ind)_2MMe_2$, $(H_4 Ind)_2MCl_2$, $(H_4 Ind)_2MMe_2$, $\{Si(CH_3)_3C_5H_2\}_2MCl_2$, $\{Si(CH_3)_3 C_5H_2\}_2MCl_2$, and $(C_5Me_4H)(C_5Me_5)MCl_2$.

16. A component according to claim 12, wherein the transition metal compound is selected from compounds that have the formula: $C_2H_4(Ind)_2MCl_2$, $C_2H_4(Ind)_2MMe_2$, $C_2H_4(H_4 Ind)_2MCl_2$, $C_2H_4(H_4Ind)_2MMe_2$, $Me_2Si(C_5Me_4)_2MCl_2$, $Me_2Si(C_5M_4)_2MMe_2$, $Me_2SiCp_2MCl_2$, $Me_2SiCp_2MMe_2$, $Me_2Si(C_5Me_4)_2MMe(OMe)$, $Me_2Si(Flu)_2MCl_2$, $Me_2Si(2-Et-5-iPrCp)_2MCl_2$, $Me_2Si(H_4 Ind)_2MCl_2$, $Me_2 Si(H_4 Flu)_2MCl_2$, $Me_2 SiCH_2(Ind)_2MCl_2$, $Me_2Si(2-Me-H_4Ind)_2MCl_2$, $Me_2Si(2-Me Ind)_2MCl_2$, $Me_2Si(2-Et-5-iPr-Cp)_2MCl_2$, $Me_2Si(2-Me-5-EtCp)_2MCl_2$, $Me_2Si(2-Me-5-Me-Cp)_2MCl_2$, $Me_2Si(2Me-4,5-benzoindenyl)_2MCl_2$, $Me_2Si(4,5-benzoindenyl)_2MCl_2$, $Me_2Si(2-EtInd)_2MCl_2$, $Me_2Si(2-iPr-Ind)_2MCl_2$, $Me_2Si(2-t-butyl-Ind)MCl_2$, $Me_2Si(3-t-butyl-5-MeCp)_2MCl_2$, $Me_2Si(3-t-butyl-5-MeCp)_2MMe_2$, $Me_2Si(2-MeInd)_2MCl_2$, $C_2H_4(2-Me-4,5-benzoindenyl)_2MCl_2$, $Me_2C(Flu)CpMCl_2$, $Ph_2Si(Ind)_2MCl_2$, $Ph(Me)Si(Ind)_2MCl_2$, $C_2H_4(H_4Ind)M(NMe_2)OMe$, isopropylidene-(3-t-butyl-Cp)(Flu)MCl_2, $Me_2C(C_5, Me_4)(C_5MeH_3)MCl_2$, $Me_2Si(Ind)_2MCl_2$, $Me_2Si(Ind)_2MMe_2$, $Me_2Si(C_5Me_4)_2MCl(OEt)$, $C_2H_4(Ind)_2M(NMe_2)_2$, $C_2H_4(C_5Me_4)_2MCl_2$, $C_2Me_4(Ind)_2MCl_2$, $Me_2Si(3-Me-Ind)_2MCl_2$, $C_2H_4(2-Me-Ind)_2MCl_2$, $C_2H_4(3-Me-Ind)_2MCl_2$, $C_2H_4(4,7-Me_2-Ind)_2MCl_2$, $C_2H_4(5,6-Me_2-Ind)_2MCl_2$, $C_2H_4(2,4,7-Me_3Ind)_2MCl_2$, $C_2H_4(3,4,7-Me_3Ind)_2MCl_2$, $C_2H_4(2-Me-H_4Ind)_2MCl_2$, $C_2H_4(4,7-Me_2-H_4 Ind)_2MCl_2$, $C_2H_4(2,4,7-Me_3-H_4Ind)_2MCl_2$, $Me_2Si(4,7-Me_2-Ind)_2MCl_2$, $Me_2Si(5,6-Me_2 -Ind)_2MCl_2$, and $Me_2Si(2,4,7-Me_3-H_4Ind)_2MCl_2$.

17. The component of claim 12, wherein the transition metal compound is selected from the group consisting of $(C_5Me_5)_2M(OH)Cl$ and $(C_5Me_5)_2M(OH)_2$.

18. A catalyst for the polymerization of olefins comprising the product of the reaction of a component according to claim 1 with an alkyl-Al compound selected from trialkyl-Al's in which the alkyl groups have from 1 to 12 carbon atoms and linear or cyclic alumoxane compounds containing the repeating unit —$(R_4)AlO$—, in which $R_4$ is an alkyl group with 1–6 carbon atoms or a cycloalkyl or aryl group with 6–10 carbon atoms and containing from 2 to 50 repeating units.

19. A catalyst according to claim 18, wherein the alkyl-Al compound is a mixture of trialkyl-Al and an alumoxane.

20. A catalyst according to claim 18, wherein the alumoxane is polymethyl-alumoxane.

21. A catalyst according to claim 18, wherein the trialkyl-Al compound is reacted with 0.5–0.01 mol of water per mole of trialkyl-Al and in which the compound of transition metal M is selected from: $C_2H_4(Ind)_2MCl_2$, $C_2H_4(Ind)_2MMe_2$, $C_2H_4(H_4 Ind)_2 MCl_2$, $C_2H_4(H_4 Ind)_2 MMe_2$, $Me_2Si(C_5Me_4)_2MCl_2$, $Me_2Si(C_5Me_4)_2MMe_2$, $Me_2SiCp_2 MCl_2$, $Me_2Si Cp_2MMe_2$, $Me_2Si(C_5Me_4H)_2MMe(OMe)$, $Me_2Si(Flu)_2MCl_2$, $Me_2Si(2-Et-5-iPrCp)_2MCl_2$, $Me_2Si(H_4 Ind)_2MCl_2$, $Me_2Si(H_4 Flu)_2MCl_2$, $Me_2SiCH_2(Ind)_2MCl_2$, $Me_2Si(2-Me-H_4 Ind)_2MCl_2$, $Me_2Si(2-MeInd)_2 MCl_2$, $Me_2Si(2-Et-5-iPr-Cp)_2MCl_2$, $Me_2Si(2-Me-5-EtCp)_2MCl_2$, $Me_2Si(2-Me-5-Me-Cp)_2MCl_2$, $Me_2Si(2-Me-4,5-benzoindenyl)_2MCl_2$, $Me_2Si(4,5-benzoindenyl)_2MCl_2$, $Me_2Si(2-EtInd)_2MCl_2$, $Me_2Si(2-iPr-Ind)_2MCl_2$, $Me_2Si(2-t-butyl-Ind)MCl_2$, $Me_2Si(3-t-butyl-5-MeCp)_2MCl_2$, $Me_2Si(3-t-butyl-5-MeCp)_2MMe_2$, $Me_2Si(2-MeInd)_2MCl_2$, $C_2H_4(2-Me-4,5- benzoindenyl)$_2$MCl$_2$, Me$_2$C(Flu)CpMCl$_2$, Ph$_2$Si(Ind)$_2$MCl$_2$, Ph(Me)Si(Ind)$_2$MCl$_2$, C$_2$H$_4$(H$_4$ Ind)M(NMe$_2$)OMe, isopropylidene-(3-t-butyl-Cp)(Flu)MCl$_2$, Me$_2$C(C$_5$Me$_4$)(C$_5$MeH$_3$)MCl$_2$, MeSi(Ind)$_2$MCl$_2$, Me$_2$Si(Ind)$_2$MMe$_2$, Me$_2$Si(C$_5$Me$_4$H)$_2$MCl(OEt), C$_2$H$_4$(Ind)$_2$M(NMe$_2$)$_2$, C$_2$H$_4$(C$_5$Me$_4$)$_2$MCl$_2$, C$_2$Me$_4$(Ind)$_2$MCl$_2$, Me$_2$Si(3-Me-Ind)$_2$MCl$_2$, C$_2$H$_4$(2-Me-Ind)$_2$MCl$_2$, C$_2$H$_4$(3-Me-Ind)$_2$MCl$_2$, C$_2$H$_4$(4,7-Me$_2$-Ind)$_2$MCl$_2$, C$_2$H$_4$(5,6-Me$_2$-Ind)$_2$MCl$_2$, C$_2$H$_4$(2,4,7-Me$_3$ Ind)$_2$MCl$_2$, C$_2$H$_4$(3,4,7-Me$_3$ Ind)$_2$MCl$_2$, C$_2$H$_4$(2-Me-H$_4$ Ind)$_2$MCl$_2$, C$_2$H$_4$(4,7-Me$_2$-H$_4$ Ind)$_2$ MCl$_2$, C$_2$H$_4$(2,4,7-Me$_3$-H$_4$ Ind)$_2$ MCl$_2$, Me$_2$Si(4,7-Me$_2$-Ind)$_2$MCl$_2$, Me$_2$Si(5,6-Me$_2$-Ind)$_2$MCl$_2$, and Me$_2$Si(2,4,7-Me$_3$-H$_4$ Ind)$_2$Cl$_2$.

22. A component according to claim 1, wherein the transition metal compound is present in a quantity of from 0.1 to 5% by weight expressed as metal atoms.

23. A component according to claim 1, wherein the component has a surface area (BET) between about 50 m$^2$/g and 150 m$^2$/g and porosity (Hg) between 0.5 and 1.2 cm$^3$/g.

24. The component of claim 7, wherein the electron donor compound is present in an amount of from 5–15 mol % based on the Mg halide.

* * * * *